Aug. 4, 1964 A. E. YOUNG 3,143,690

ELECTROMAGNETIC PINCH ROLLER ACTUATOR

Filed Jan. 25, 1962 3 Sheets-Sheet 1

ARTHUR E. YOUNG
INVENTOR.

BY Nathan N. Kallman

ATTORNEY

ARTHUR E. YOUNG
INVENTOR.

BY Nathan N. Kallman

ATTORNEY

ARTHUR E. YOUNG
INVENTOR.
BY Nathan N. Kallman
ATTORNEY

United States Patent Office 3,143,690

Patented Aug. 4, 1964

3,143,690

ELECTROMAGNETIC PINCH ROLLER ACTUATOR

Arthur E. Young, Menlo Park, Calif., assignor to Ampex Corporation, Redwood City, Calif., a corporation of California Filed Jan. 25, 1962, Ser. No. 168,621
5 Claims. (Cl. 317—171)

This invention relates to electromagnetic actuating devices and particularly to such a device producing a rotary output motion.

In a magnetic tape transport mechanism, and often in other applications, there is a definite need for a device capable of exerting a precise amount of force through a limited distance. Such a need arises in connection with a pinch roller drive mechanism, by which a magnetic tape may be advanced through a tape transport assembly by being clamped between an idler roller (hereinafter called pinch roller) and a drive capstan, which is rotating at a preselected speed. In such an application it is extremely desirable that the force with which the tape is gripped between the capstan and the pinch roller be maintained at a relatively precise level. Furthermore, the force should be applied or removed within a very short time interval in order to prevent slipping of the tape and relatively long acceleration and deceleration times. It is also desirable that this pinching force be applied and controlled with a minimum of required power, because the force is generally applied during the entire time that the tape transport mechanism is in operation. Finally, because a tape transport mechanism and its associated apparatus are usually arrayed in a somewhat limited space, it is desirable that the pinch roller drive mechanism be compact and able to fit into existing arrangements.

The need for a precisely controlled amount of force operating in a very short time interval suggests the use of an electromagnetic actuator. Such a device is capable of providing a predetermined force in response to electrical signals. However, such electromagnetic actuators as are known have not proven fully satisfactory when applied to magnetic tape transport mechanisms. What is needed is a device which will provide the requisite force within an interval of one millisecond or less and which can be mounted close to the tape drive capstan on the supporting structure of a tape transport mechanism. This last requirement may be fulfilled adequately by a device which has the output shaft located near one side of the device.

Most electromagnetic actuators are arranged in a symmetrical configuration with the output shaft emerging somewhere near the center of the structure. Furthermore, few previously known electromagnetic actuators are capable of developing the desired torque (output force at a prescribed lever distance) necessary for operating within the prescribed time interval. Certain known electromagnetic actuators fulfill some of the above-mentioned characteristics and even have the desired non-symmetrical structural configuration, but they may generate external magnetic fields that seriously impair the condition of the magnetic tape when they are employed in connection with a tape transport mechanism.

It is therefore an object of the present invention to provide an improved electromagnetic actuator mechanism.

It is another object of the invention to provide an electromagnetic actuator suitable for use as a pinch roller actuator in a tape transport mechanism.

It is another object to provide an electromagnetic actuator having an extremely rapid response to applied electrical signals.

It is a further object of the invention to provide an electromagnetic actuator having its output shaft mounted near one side of the actuator for use in a tape transport mechanism.

It is a still further object of the invention to provide an electromagnetic actuator for maintaining a predetermined output torque over a long period with a relatively low electrical power input.

Briefly, one particular arrangement in accordance with the invention combines a permanent magnet, a solenoid coil, and a magnetic iron core in a magnetic flux balanced device. Basically the magnetic iron core is formed in two sections, each of which bears a configuration roughly approximating the letter E. The two E-shaped halves of the core are arranged facing each other on opposite sides of a permanent magnet which is inserted in line with the lowest horizontal portions, which will be referred to as legs, of the E-shaped configurations. The solenoid coil is disposed around the center leg of one of the E-shaped core halves. Positioned transversely to the two upper pairs of flux legs and extending between the two halves of the core is a magnetic iron armature. The armature is suspended from the frame of the actuator so as to rotate about a pivot point as the lower end is moved from side to side between the two center legs of the core. A spring arrangement is incorporated in the armature suspension mechanism so that the armature is normally held at a central position. In this position, with no electromagnetic field developed by the associated solenoid coil, the flux which is developed in the core by the permanent magnet is evenly distributed in the upper legs of the core. In this condition the respective forces are balanced so that the armature is stable at its central position. However, when an electromagnetic field is generated by a suitable current flowing in the solenoid coil in an appropriate direction, a different flux pattern is established that generates forces tending to move the armature toward one side of the core. In this condition, flux from the permanent magnet is canceled in certain portions of the core by the flux generated by the electromagnetic field of the solenoid. Thus flux is developed within the armature in a direction extending between the upper and middle legs of the core so that the armature itself acts as a magnet having a lever arm exhibiting a rotational force about its suspension point. In this manner, current in the solenoid coil associated with the actuator device is enabled to switch the flux developed by the permanent magnet rather than being required to generate sufficient flux to provide the requisite actuating force by itself. Thus an efficient mechanism is provided which is capable of generating a suitable torque at a predetermined level without the requirement of a large amount of applied electrical power.

In a particular arrangement in accordance with the invention described above, the armature suspension mechanism includes a torque bar section of the armature shaft to provide the requisite torque to restore the armature to its central position when the electrical energizing signal is removed from the solenoid coil. An output shaft is positioned along the axis of suspension of the armature which is arranged at one side of the actuator mechanism so that the output torque may be utilized in close proximity to other components associated with a tape drive mechanism. The symmetrical configuration of the flux legs and the utilization of the core to completely enclose the solenoid coil in providing a very nearly closed magnetic path for the flux developed by the permanent magnet and by the solenoid coil advantageously serves, in accordance with an aspect of this invention, to confine the magnetic fields within the actuator device itself, thus minimizing the possibility that stray fields may adversely affect the condition of the tape as it passes through the transport mechanism. In accordance with another aspect of the invention, the solenoid coil is arranged to present a very low inductance to applied electrical signals, thus combining with the short armature travel achieved by the particular structural configuration of the invention to provide an actuator having an extremely short response time to applied electrical signals. While only one solenoid coil has been described thus far, the core configuration is symmetrical so that another separate coil may be mounted on the center leg of the opposed core. Thus, depending on which one of the solenoid coils is energized, the armature may be driven in either direction from its central quiescent position. By virtue of the particular configuration of the described arrangement of the invention, the two coils are not inductively coupled, but are rather shielded to a major degree by the way in which the armature is interposed between the two halves of the core structure. Also, the torque bar suspension mechanism serves to exert a restoring force regardless of the direction of rotation of the armature.

A better understanding of the invention may be had from a consideration of the following detailed description, taken in conjunction with the drawings wherein like elements are given like numerical designations, and in which.

Figure 1:
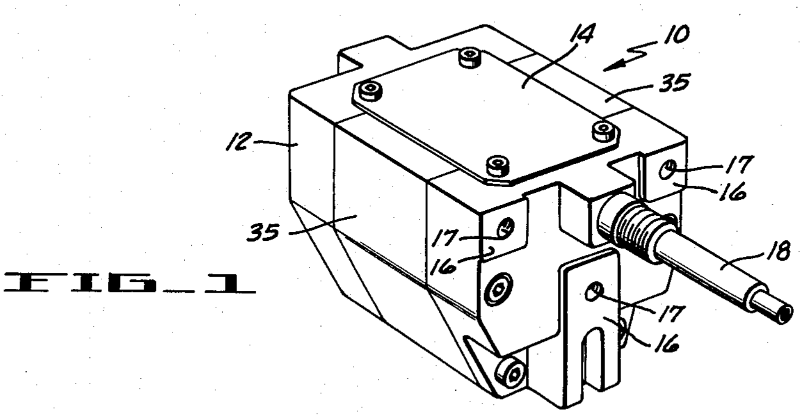
FIGURE 1 is a perspective view of one particular arrangement in accordance with the invention.

FIGURE 1 is a perspective view of one particular arrangement of the invention showing an electromagnetic actuator 10 having a housing 12 to which is attached a cover plate 14. The front of the housing 12 is shown having raised portions 16 wherein threaded holes 17 are located to facilitate the mounting of the actuator 10 upon the panel of a tape recording apparatus.

Figure 2:
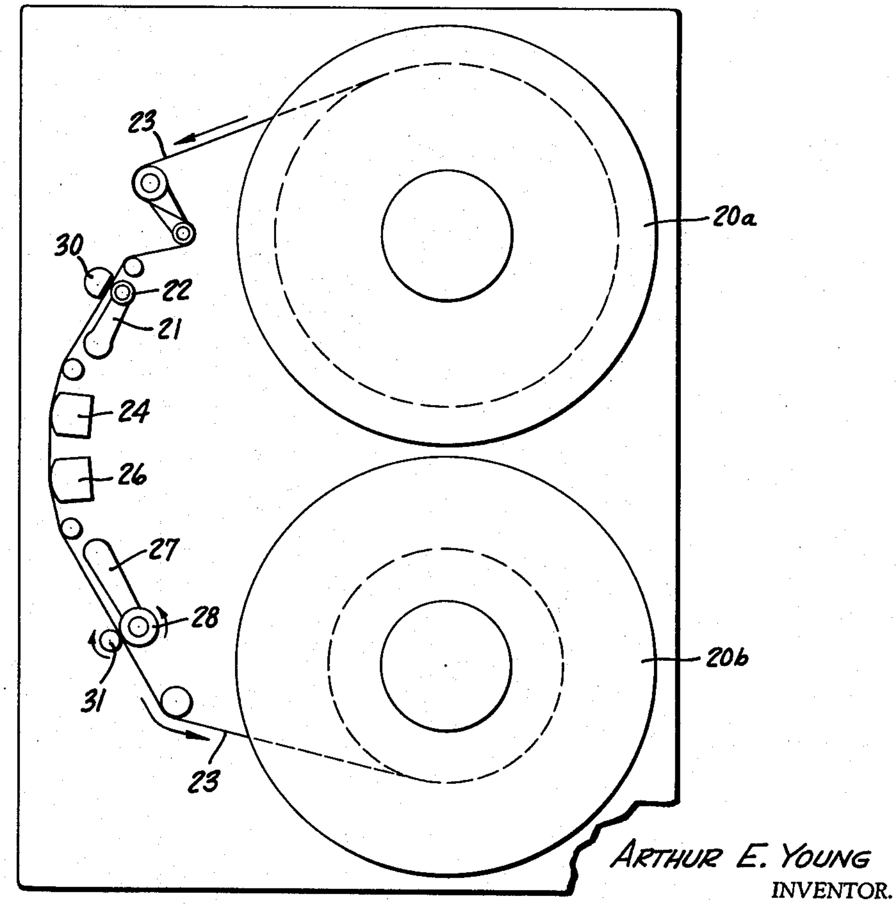
FIGURE 2 is a view of a tape transport mechanism in which the invention may be employed to advantage.

The tape transport mechanism of such an apparatus is shown in FIGURE 2. The transport includes a pair of tape reels 20*a*, *b* between which the magnetic tape 23 is transported. The tape transport mechanism includes a number of pulleys and guides together with one or a plurality of magnetic heads, such as the write head 24 and the playback head 26. The tape transport mechanism of FIGURE 2 incorporates a pair of electromagnetic actuators, such as shown in FIGURE 1, of which only the lever arms attached to the actuator output shafts are visible. The respective actuators 10 are mounted behind the panel supporting the tape transport mechanism.

Each lever arm 21 and 27 includes a suitable arrangement for fixed attachment to the output shaft 18 of the associated actuator 10, together with a pinch roller 22 and 28 respectively, each of which is disposed to bear against the tape 23 when the associated actuator 10 is energized. In operation, the pinch roller 28 urges the tape 23 against an associated rotating element and maintains a prescribed pressure on the tape during actuation. In the tape transport of FIGURE 2, the lever 21 and pinch roller 22 are associated with a brake spindle 30, whereas the lever 27 and pinch roller 28 are associated with a drive capstan 31. Thus the assembly including pinch roller 22 is employed for stopping the tape and holding it stationary, while the assembly including pinch roller 28 is utilized to advance the tape at a predetermined constant rate through the mechanism by virtue of the rotating capstan 31. The capstan 31 is driven by an associated motor and drive mechanism (not shown) which is mounted behind the supporting panel.

Figure 3:
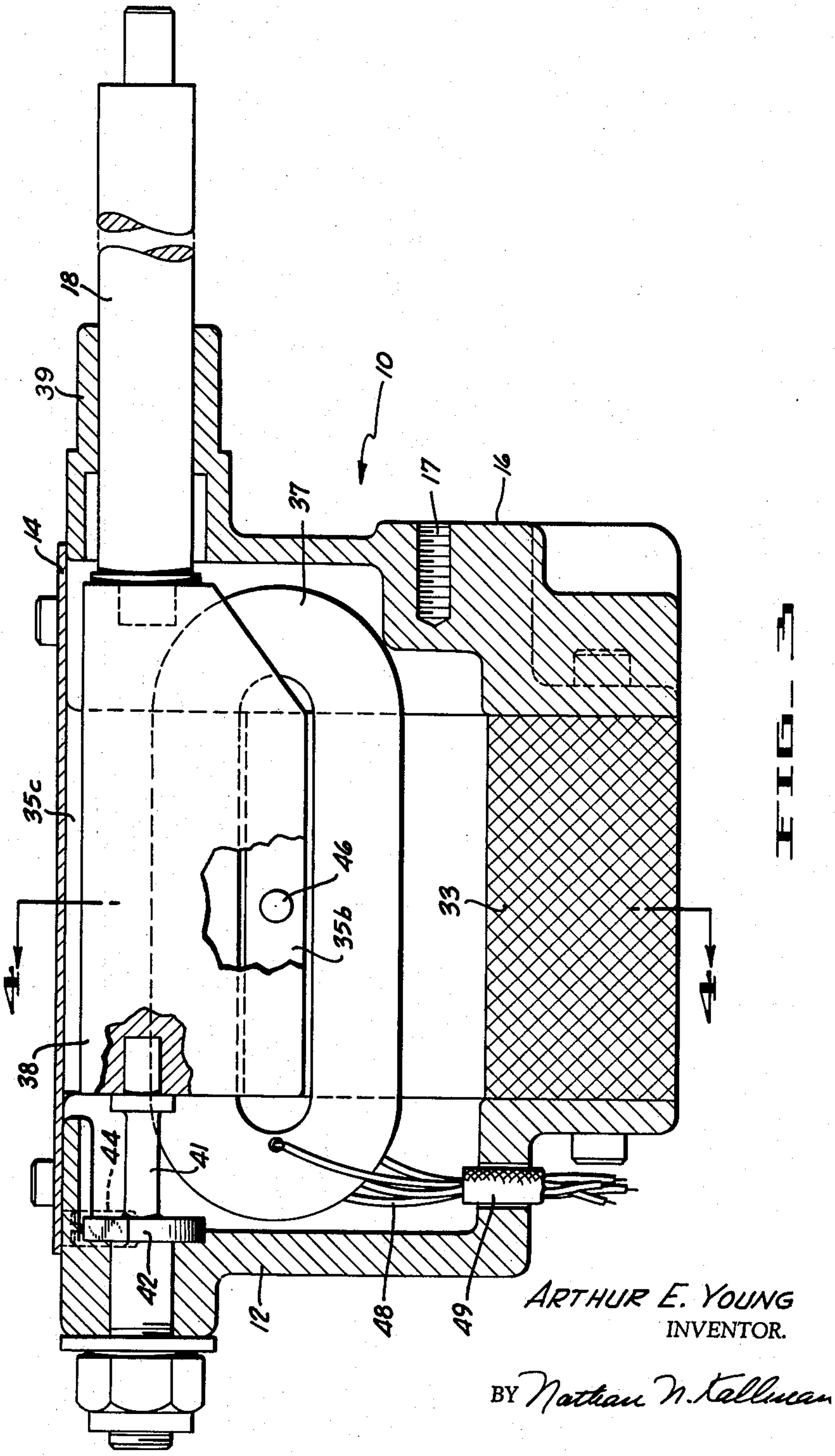
FIGURE 3 is a side sectional view of the arrangeemnt shown in FIGURE 1.
Figure 4:
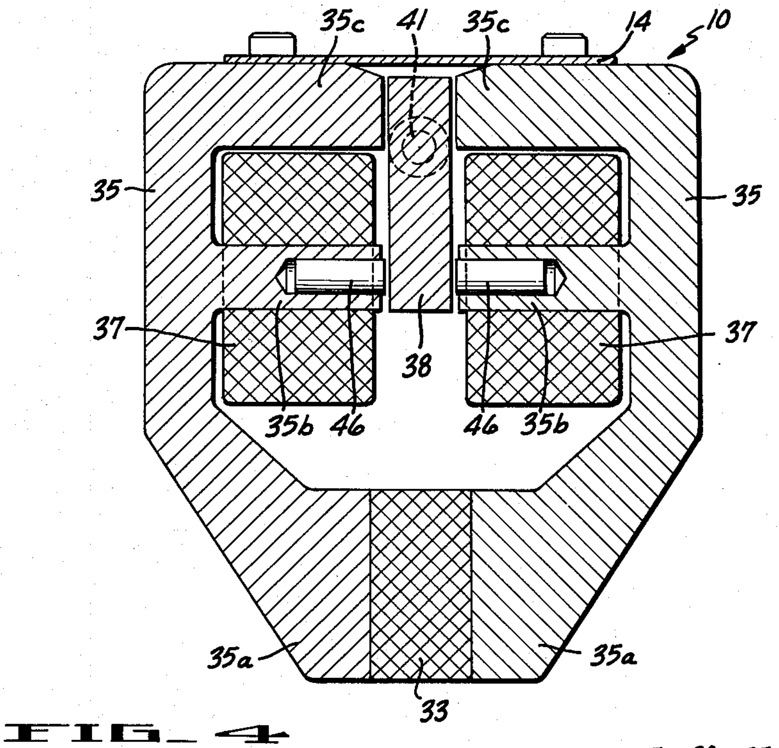
FIGURE 4 is a sectional view taken along the line 4—4 of FIGURE 3.

FIGURES 3 and 4, which are side and end sectional views respectively of the arrangement of FIGURE 1, depict various constructional details of the arrangement. Separate generally E-shaped core sections 35 (best seen in FIGURE 4) are mounted within the housing 12 of the actuator 10. The intermediate permanent magnet 33 may advantageously be fabricated of a material known as Alnico V, grain oriented to produce the requisite flux density in the core members. Each of the two facing core members 35 is fabricated to have a lower leg portion 35*a*, a center leg portion 35*b*, and an upper leg portion 35*c*. Different solenoid coils 37 are positioned to surround each of the centtral legs 35*b* of the core members 35.

An armature 38 is rotatably suspended between the two core members 35 opposite the upper leg portions 35*b* and 35*c*. One end of the armature 38 is attached to the output shaft 18, which extends through a bearing 39 (FIGURE 3) serving as a suspension member for the armature assembly. The other end of the armature 38 is attached to a torsion bar member 41 which is held at its opposite end 42 by suitable retaining screws 44. Pins 46 (FIGURE 4) which may be fabricated from a nonmagnetic material, such as brass, are press fitted into the central leg portions 35*b* of the core members 35 to limit the travel of the armature 38. Thus the armature is free to rotate within the limits determined by the position of the pins 46 about its axis of suspension in line with the shaft 18. The armature 38 is centered between the pins 46 by virtue of the torsion bar arrangement including the torsion section 41 and the retaining screws 44. This arrangement maintains the armature 38 in a central or rest position in the absence of a magnetic flux distribution pattern tending to force it to another position. Suitable electrical connections to the solenoid coils 37 are provided via leads 48 which are shown running into a cable 49 which extends through the housing 12 for connection to associated electrical circuitry.

Figure 5A:
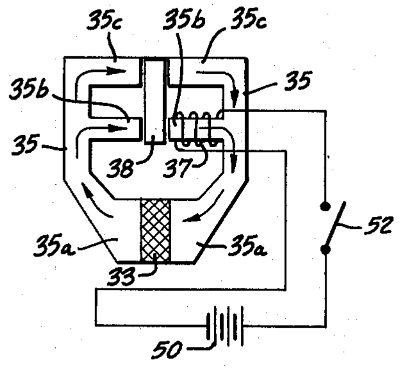
FIGURES 5A and 5B are schematic representations showing particular magnetic flux patterns established during the operation of the arrangement of FIGURE 1.
Figure 5B:
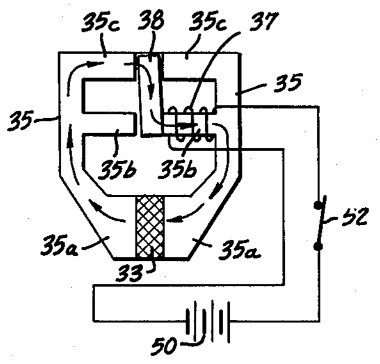

An understanding of the operation of this exemplification of the invention may be gained by referring to FIGURES 5A and 5B. These figures represent schematically the direction of magnetic flux in the various portions of the core and armature assembly. A single coil 37 is shown adapted to be connected to a source of voltage 50, represented as a battery, via a switch 52. In FIGURE 5A, the switch 52 is shown in the open position so that no current flows in the coil 37 and thus the quiescent condition of magnetic flux is maintained in the core members 35, permitting the armature 38 to remain in its rest position. In this condition, by virtue of the symmetrical configuration of the arrangement, flux from the permanent magnet 33 is substantially equally distributed between the center legs 35*b* and the upper legs 35*c*. Thus, the magnetomotive force between the opposite ends of the armature 38 is substantially zero with the result that flux extends transversely across the armature 38 rather than in the longitudinal direction of its lever arm. Therefore, no effective force is developed which would rotate the armature 38 about its suspension point.

In FIGURE 5B, a different condition exists by virtue of the fact that the switch 52 is closed to permit current to flow from the voltage source 50 through the coil 37. With the coil 37 energized, an additional magnetomotive force is produced which distorts the symmetrical pattern of the flux distribution of FIGURE 5A. The current in the solenoid coil 37 develops flux tending to reinforce the pre-existing flux in the right hand center leg 35*b* and to cancel the pre-existing flux in the right hand upper leg 35*c*. When the coil 37 is energized, flux is established in the longitudinal direction of the lever arm of the armature 38. By virtue of the new flux distribution pattern, the lower end of the armature 38 is attracted toward the right hand center leg 35*b*. Thus the armature 38 rotates about its suspension axis and a rotational force or torque is transmitted to the output shaft 18. When the switch 52 is opened, thus de-energizing the solenoid coil 37, the restoring torque developed by the torsion member 41 returns the armature 38 to its rest position. While for the sake of simplicity only one coil 37 has been shown in the diagrams of 5A and 5B, it will be understood that a corresponding operation tending to produce a rotation of the armature 38 in the opposite direction may be achieved by energizing a coil 37 on the left hand center leg *35b*.

This exemplification of the invention advantageously develops the desired output torque throughout the selected angle of rotation. The particular configuration of the core structure permits the solenoid coils to be completely enclosed by an effective magnetic shield, thus substantially eliminating the external magnetic fields which are likely to adversely affect the condition of the magnetic tape with which the actuator is associated. It will be noted that by virtue of such arrangement, no magnetomotive force which would tend to oppose the magnetomotive force of the permanent magnet 33 is developed. Thus the tendency of the strength of the field in the permanent magnet to be weakened following repeated operations of the device, as in the case of certain previously known actuator structures, is avoided.

In accordance with another feature of the invention, the coil 37 is designed to have a relatively low value of inductance. The coil 37 thus exhibits an extremely short time constant and this factor, coupled with the structural arrangement of the armature and core, provides particularly short response times. By the use of the actuator 10 in a tape transport mechanism such as is shown in FIGURE 2, a tape 23 may be started or stopped in one millisecond or less in response to appropriate energizing signals. It will be noted that in FIGURE 1 the output shaft is shown positioned very close to the upper edge of the actuator 10. Thus the actuator may be mounted with its output shaft in close proximity to adjacent components. Furthermore, the armature and core assembly is symmetrically disposed so that the armature may be rotated in either direction. In consequence the same actuator may be positioned at two different points in the tape transport mechanism to provide clockwise rotation against the drive capstan 31 to transport the tape 23 and to provide counterclockwise rotation against the brake spindle 30 to hold the tape stationary. This operation is advantageously permitted by virtue of the selective energization of the appropriate coil 37 within the actuator 10.

It is understood that the scope of the invention is not necessarily limited to the particular configuration set forth above, and that various changes and modifications may be introduced in the embodiment described in which the features of the invention are incorporated.

What is claimed is:

1. An electromagnetic actuator suitable for high speed movement of a pinch roller in a magnetic tape transport, comprising:
   a symmetrical magnetic core structure including two halves each having a number of legs, the legs of the two halves being in opposed facing relation;
   permanent magnet means positioned between a pair of the opposed legs and establishing a particular magnetic flux pattern in the core structure;
   armature means rotatable about a selected axis between two other opposed pairs of legs of the two halves, the armature means normally being equidistant from each of the opposed legs;
   and means adjacent to but one selected leg of said two other pairs for increasing the flux density in said selected leg, thereby modifying the flux pattern in the core structure, thereby to rotate the armature.

2. An electromagnetic actuator comprising:
   a pair of symmetrically opposed magnetic core sections, the sections providing at least three magnetic flux gaps therebetween;
   permanent magnet means positioned in one of the magnetic flux gaps and providing a symmetrical flux distribution pattern in the other flux gaps;
   movable magnetic armature means positioned between at least two of the other flux gaps;
   and means adjacent to but one of said core sections for producing an asymmetrical flux distribution pattern to move the armature.
3. An electromagnetic actuator comprising:
   a symmetrical core structure having a pair of opposed substantially E-shaped portions;
   a permanent magnet mounted between opposed lower legs of said core portions;
   an armature member suspended along an axis of suspension located between opposed upper legs of said core portions and extending transversely through said legs to a point between the opposed middle legs of said core portions;
   at least one solenoid coil arranged about only one of said middle legs of said core;
   means for maintaining the armature in a central rest position in the absence of applied electrical signals;
   and means for supplying electrical current to said coil for rotating said armature at a predetermined angle.
4. An electromagnetic actuator in accordance with claim 3 wherein said means for maintaining the armature in a central rest position comprises a torsion bar extension of the armature along its axis of suspension.
5. An electromagnetic actuator comprising:
   a flux balanced core structure;
   an armature in the form of a lever arm;
   the core structure including a pair of opposed central legs on opposite sides of the armature;
   means for suspending the armature at one end of its lever arm about an axis of suspension;
   an output shaft attached to the armature and extending therefrom in line with the axis of suspension of the armature near one edge of the actuator;
   at least one solenoid coil surrounding one of said central legs and having leads connected thereto for the application of electrical energizing signals;
   a permanent magnet included in said core structure and establishing a predetermined balanced flux pattern therein;
   and means coupled to the solenoid coil for unbalancing said flux pattern in response to an applied electrical signal in order to cause the armature to move and rotate said output shaft through a predetermined angle.

References Cited in the file of this patent

UNITED STATES PATENTS

| | | |
|---|---|---|
| 2,930,945 | Weathers et al. | Mar. 29, 1960 |
| 3,071,714 | Hadekel | Jan. 1, 1963 |